(12) United States Patent
Chang et al.

(10) Patent No.: US 9,091,871 B2
(45) Date of Patent: Jul. 28, 2015

(54) POLARIZING LIQUID CRYSTAL PANEL AND DISPLAY APPARATUS INCLUDING THE SAME

(71) Applicant: SAMSUNG DISPLAY CO., LTD., Yongin, Gyeonggi-Do (KR)

(72) Inventors: Jae-Hyuk Chang, Seongnam-si (KR); Han-Sun Ryou, Hwaseong-si (KR); Yu-Deok Seo, Daejeon (KR); Min-Uk Kim, Seongnam-si (KR); Hyun-Seok Kim, Anyang-si (KR); Ki-Beom Lee, Seoul (KR); Sung-Hee Lee, Seoul (KR); Seung-Jun Lee, Yongin-si (KR); Nam-Ok Jung, Suwon-si (KR); Gug-Rae Jo, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 244 days.

(21) Appl. No.: 13/706,790

(22) Filed: Dec. 6, 2012

(65) Prior Publication Data

US 2013/0148046 A1    Jun. 13, 2013

(30) Foreign Application Priority Data

Dec. 7, 2011 (KR) .......... 10-2011-0130182

(51) Int. Cl.
*G02F 1/1335* (2006.01)
*G02F 1/13* (2006.01)
*H04N 13/04* (2006.01)
*G02B 27/22* (2006.01)
*G02F 1/1333* (2006.01)
*G02F 1/1347* (2006.01)
*G02B 27/26* (2006.01)

(52) U.S. Cl.
CPC .......... *G02F 1/1313* (2013.01); *G02B 27/2214* (2013.01); *G02B 27/26* (2013.01); *G02F 1/1347* (2013.01); *G02F 1/133305* (2013.01); *H04N 13/0404* (2013.01)

(58) Field of Classification Search
CPC . G02B 27/2214; G02B 27/26; H04N 13/0404
USPC .......................................................... 349/15
See application file for complete search history.

(56) References Cited

U.S. PATENT DOCUMENTS

| 5,237,439 | A * | 8/1993 | Misono et al. ............... 349/122 |
| 7,420,637 | B2 | 9/2008 | Imai et al. |
| 2008/0030574 | A1 * | 2/2008 | Sun ................................ 348/58 |
| 2010/0045640 | A1 | 2/2010 | Park et al. |

FOREIGN PATENT DOCUMENTS

KR        0952137 B1    4/2010

* cited by examiner

*Primary Examiner* — Phu Vu
(74) *Attorney, Agent, or Firm* — Cantor Colburn LLP

(57) ABSTRACT

In a polarizing liquid crystal panel and a display apparatus including the polarizing liquid crystal panel, the polarizing liquid crystal panel includes a first substrate, a second substrate and a liquid crystal layer. The first substrate includes a plastic substrate, a first electrode on the plastic substrate, and a first alignment layer on the first electrode. The second substrate includes a base substrate which opposes the first substrate, a second electrode on the base substrate, and a second alignment layer on the second electrode. The liquid crystal layer is between the first and second substrates and polarizes a light using an electric field between the first and second electrodes.

18 Claims, 4 Drawing Sheets

US 9,091,871 B2

POLARIZING LIQUID CRYSTAL PANEL AND DISPLAY APPARATUS INCLUDING THE SAME

This application claims priority to Korean Patent Application No. 10-2011-0130182, filed on Dec. 7, 2011, and all the benefits accruing therefrom under 35 U.S.C. §119, the contents of which are herein incorporated by reference in its entirety.

BACKGROUND OF THE INVENTION

1. Field of the Invention

Exemplary embodiments of the invention relate to a polarizing liquid crystal panel and a display apparatus including the polarizing liquid crystal panel. More particularly, exemplary embodiments of the invention relate to a polarizing liquid crystal panel used for a display apparatus displaying a stereoscopic image and a display apparatus including the polarizing liquid crystal panel.

2. Description of the Related Art

Generally, a display apparatus displaying a stereoscopic image displays a three-dimensional ("3D") image using a binocular parallax between two eyes of an observer. The displaying of the stereoscopic image using the binocular parallax may be divided to a stereoscopic type display and an auto-stereoscopic type display.

An example of the stereoscopic type display may include a polarizing glass type display using polarizing glasses having different polarizing properties from each other corresponding to a left eye and a right eye of the observer. The polarizing glass type display may generally include a patterned retarder type display using a space division and an active retarder type display using a time division.

The active retarder type display includes an active switch panel ("ASP") as a polarizing panel converting a polarizing property of the stereoscopic image to generate a left eye image and a right eye image. The ASP may polarize a light using a liquid crystal.

Generally, a display apparatus using the ASP further includes two glass substrates with respect to the ASP, which are separate members from two glass substrates of a display panel of the display apparatus. Thus, since there are four glass substrates in the display apparatus using the ASP, there are disadvantages in that a manufacturing cost of the display apparatus is increased, and an overall weight and a thickness of the display apparatus are increased.

BRIEF SUMMARY OF THE INVENTION

Exemplary embodiments of the invention provide a polarizing liquid crystal panel having a stable structure in changing environmental conditions which may include moisture elements, and decreasing a manufacturing cost thereof.

Exemplary embodiments of the invention also provide a display apparatus including the polarizing liquid crystal panel.

According to an exemplary embodiment of the invention, the polarizing liquid crystal panel includes a first substrate, a second substrate and a liquid crystal layer. The first substrate includes a plastic substrate, a first electrode on the plastic substrate, and a first alignment layer on the first electrode. The second substrate includes a base substrate opposing the first substrate, a second electrode on the base substrate, and a second alignment layer on the second electrode. The liquid crystal layer is disposed between the first and second substrates and polarizes a light using an electric field between the first and second electrodes.

In an embodiment, the first substrate may further include a buffer layer between the plastic substrate and the first electrode to protect the plastic substrate.

In an embodiment, one of the first and second electrodes may include a patterned electrode including a plurality of sub-electrodes. The first electrode may include a patternless electrode on an entire of the plastic substrate, and the second electrode may include a patterned electrode including a plurality of sub-electrodes.

In an embodiment, the base substrate may be a plastic substrate. Here, the second substrate may further include a moisture resistant layer on one of a first surface of the base substrate including the second electrode thereon, and a second surface opposing the first surface.

The moisture resistant layer may include an organic material. Alternatively, the second substrate may further include a buffer layer between the base substrate and the second electrode to protect the base substrate.

In an embodiment, the base substrate may be a glass substrate.

In an embodiment, the plastic substrate may include polycarbonate ("PC"), triacetiyl cellulose ("TAC") or cyclic olefin copolymer ("COC").

According to an exemplary embodiment of the invention, the display apparatus includes a display panel and a polarizing liquid crystal panel. The display panel displays a stereoscopic image. The polarizing liquid crystal panel is disposed on the display panel and includes a first substrate, a second substrate and a liquid crystal layer. The first substrate includes a plastic substrate, a first electrode on the plastic substrate and a first alignment layer on the first electrode. The second substrate includes a base substrate opposing the first substrate, a second electrode on the base substrate and a second alignment layer. The liquid crystal layer is disposed between the first and second substrates and polarizes a light passing through the display panel.

In an embodiment, the first substrate may be disposed on the display panel, and the base substrate may be a plastic substrate. Here, the second substrate may further include a moisture resistant layer including an organic material.

In an embodiment, the first substrate may be disposed on the display panel, and the base substrate may be a glass substrate.

In an embodiment, the second substrate may be disposed on the display panel, and the base substrate may be a glass substrate. Here, the first substrate may further include a moisture resistant layer including an organic material.

In an embodiment, the display apparatus may further include a touch screen member disposed on the polarizing liquid crystal panel.

In an embodiment, the display apparatus may further polarizing glasses receiving an image passing through the polarizing liquid crystal panel. The polarizing glasses may include a left eye part and a right eye part having different polarizing properties from each other.

According to an exemplary embodiment of the invention, the display apparatus includes a display panel displaying a stereoscopic image, a polarizing member, an opposite substrate and a liquid crystal layer. The polarizing member is disposed on the display panel and includes a first surface which faces the display panel, a first electrode on a second surface opposite to the first surface, and a first alignment layer on the first electrode. The opposite substrate includes a plastic substrate facing the polarizing member, a second electrode on the plastic substrate, a second alignment layer on the second electrode, and a moisture resistant layer including an organic material. The liquid crystal layer is interposed between the polarizing member and the opposite substrate.

According to one or more embodiments of the invention, at least one base substrate of two substrate of a polarizing liquid crystal panel uses a plastic substrate to decrease a material cost in comparison to use a glass substrate for all base substrates. Thus, productivity of manufacturing the polarizing liquid crystal panel and the display apparatus may be improved.

In addition, when a base substrate of a lower substrate in the polarizing liquid crystal panel adjacent to a display panel uses the plastic substrate, the display panel may reduce or effectively prevent moisture from penetrating into the polarizing liquid crystal panel. Alternatively, when a base substrate of an upper substrate opposing the lower substrate in the polarizing liquid crystal panel uses the plastic substrate, a moisture resistant layer including an organic material cheaper than an inorganic material is used to minimize penetration of the moisture into the polarizing liquid crystal panel. Therefore, the polarizing liquid crystal panel may have a stable structure in changing environmental conditions which may include moisture elements.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

Figure 1:
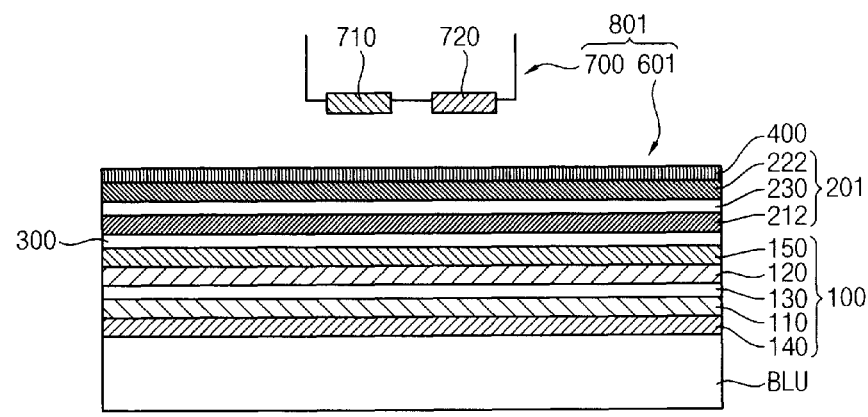
FIG. 1 is a cross-sectional view illustrating an exemplary embodiment of a display apparatus according to the invention.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "upper" or "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is a cross-sectional view illustrating an exemplary embodiment of a display apparatus according to the invention.

Referring to FIG. 1, a display apparatus 801 includes a display part 601 and a polarizing glasses part 700. The display part 601 displays a two-dimensional ("2D") image or a three-dimensional ("3D") image, and a viewer may stereoscopically recognize the 3D image through the polarizing glasses part 700 when the display part 601 displays the 3D image.

The display part 601 includes a display panel 100 substantially displaying the 2D image or the 3D image, and a polarizing liquid crystal panel 201 polarizing a light passing through the display panel 100. The display part 601 may further include an adhesive member 300 combining the display panel 100 with the polarizing liquid crystal panel 201 to each other, and a phase retardation member 400. In addition, the display panel 601 may further include a backlight assembly BLU providing a light to the display panel 100. The backlight assembly BLU is disposed under the display panel 100.

The display panel 100 includes a first display substrate 110, a second display substrate 120 and a display element layer 130. The display panel 100 further includes a first polarizing member 140 and a second polarizing member 150.

The first display substrate 110 may include a plurality of pixel electrodes arranged in a matrix shape. The pixel electrodes may be on a glass substrate as a base substrate of the first display substrate 110. The first display substrate 110 may include signal lines on the glass substrate and connected to the pixel electrodes, and a lower alignment layer on the glass substrate including the pixel electrodes thereon.

The second display substrate 120 faces the first display substrate 110 and includes a common electrode forming an electric field in the display element 130, with the pixel electrodes of the first display substrate 110. The common electrode may be on a glass substrate as a base substrate of the second display substrate 120. The second display substrate 120 may include an upper alignment layer on the glass substrate including the common electrode thereon. The second display substrate 120 may include a color filter layer representing colors. Alternatively, the first display substrate 110 may include the color filter layer.

The display element layer 130 is interposed between the first and second display substrates 110 and 120. The display element layer 130 may include a plurality of liquid crystal molecules. The liquid crystal molecules control a transmittance of the light provided from the backlight assembly BLU by the electric field in the display element 130, to display an image.

The first polarizing member 140 is on the first display substrate 110. The first polarizing member 140 is on the glass substrate including the pixel electrodes thereon. When the pixel electrodes are on a first surface of the glass substrate of the first display substrate 110, the first polarizing member 140 is on a second surface of the glass substrate opposite to the first surface of the first display substrate 110.

The second polarizing member 150 is on the second display substrate 120. The second polarizing member 150 is on the glass substrate including the common electrode thereon. When the common electrode is on a first surface of the glass substrate of the second display substrate 120, the second polarizing member 150 is on a second surface of the glass substrate opposite to the first surface of the second display substrate 120. A polarizing axis of the second polarizing member 150 may be perpendicular to or parallel with a polarizing axis of the first polarizing member 140.

The polarizing liquid crystal panel 201 includes a first substrate 212 as a lower substrate, a second substrate 222 as an upper substrate, and a liquid crystal layer 230. The first substrate 212 is disposed on the display panel 100, and the second substrate 222 is disposed opposite the first substrate 212 with respect to the liquid crystal layer 230. The first substrate 212 may face the second polarizing member 150 of the display panel 100. The liquid crystal layer 230 is interposed between the first and second substrates 212 and 222. The polarizing liquid crystal panel 201 will be illustrated in detail, referring to FIG. 2.

The adhesive member 300 is disposed between the display panel 100 and the polarizing liquid crystal panel 210 to combine the display panel 100 with the polarizing liquid crystal panel 210. In one exemplary embodiment, for example, the adhesive member 300 may attach the second display substrate 120 of the display panel 100 to the first substrate 212 of the polarizing liquid crystal panel 201. When the display panel 100 includes the second polarizing member 150, the adhesive member 300 attaches the second polarizing member 150 of the display panel to the first substrate 212 of the polarizing liquid crystal panel 201. The adhesive member 300 includes a film type adhesive material or a liquid type adhesive material, and the adhesive material is hardened to combine the display panel 100 with the polarizing liquid crystal panel 201. The adhesive material may be thermally hardened or photocured, for example, cured by an ultraviolet light.

The phase retardation member 400 is disposed on a viewing side of the polarizing liquid crystal panel 201. The phase retardation member 400 is disposed directly on the second substrate 222. The phase retardation member 400 may circularly-polarize a light passing through the polarizing liquid crystal panel 201. In one exemplary embodiment, for example, when a linearly polarized light passes through the phase retardation member 400, the linearly polarized light may be polarized to be a circularly polarized light. In one exemplary embodiment, for example, the phase retardation member 400 may be a quarter wave length plate.

The polarizing glasses part 700 may include a right eye portion 710, and a left eye portion 720 having a polarizing property different from the right eye portion 710. A first polarized light passing through the polarizing liquid crystal panel 201 and the phase retardation member 400 may be provided to a right eye of a viewer via the right eye portion 710. In addition, a second polarized light passing through the polarizing liquid crystal panel 201 and the phase retardation member 400 may be provided to a left eye of the viewer via the left eye portion 720. The first polarized light may be a first circularly polarized light formed by circularly-polarizing a first linearly polarized light provided from the polarizing liquid crystal panel 201 with passing through the phase retardation member 400. The second polarized light may be a second circularly polarized light formed by circularly-polarizing a second linearly polarized light provided from the polarizing liquid crystal panel 201 and which passes through the phase retardation member 400.

In one exemplary embodiment, for example, the display panel 100 displays a first image and the polarizing liquid crystal panel 201 has a first polarized state during a first sub-frame. A light provided from the display panel 100 to the polarizing liquid crystal panel 201 passes through the polarizing liquid crystal panel 201 to be the first linearly polarized light. Then, the first linearly polarized light passes through the phase retardation member 400 to be the first circularly polarized light and to be provided to the right eye of the viewer via the right eye portion 710. In addition, the display panel 100 displays a second image and the polarizing liquid crystal panel 201 has a second polarized state during a second sub-frame. The second circularly polarized light is provided to the left eye of the viewer via the left eye portion 720 by the polarizing liquid crystal panel 201 and the phase retardation member 400. Thus, the viewer may stereoscopically recognize the 3D image through the display apparatus 801.

In FIG. 1, the display panel 100 includes the display element layer 130 and the display apparatus 801 includes the backlight assembly BLU. Alternatively, a display panel 100 disposed under the polarizing liquid crystal panel 201 may include an electric luminance element and the backlight assembly BLU may be omitted.

Hereinafter, a structure of the polarizing liquid crystal panel 201 shown in FIG. 1 will be illustrated in detail, referring to FIG. 2.

Figure 2:
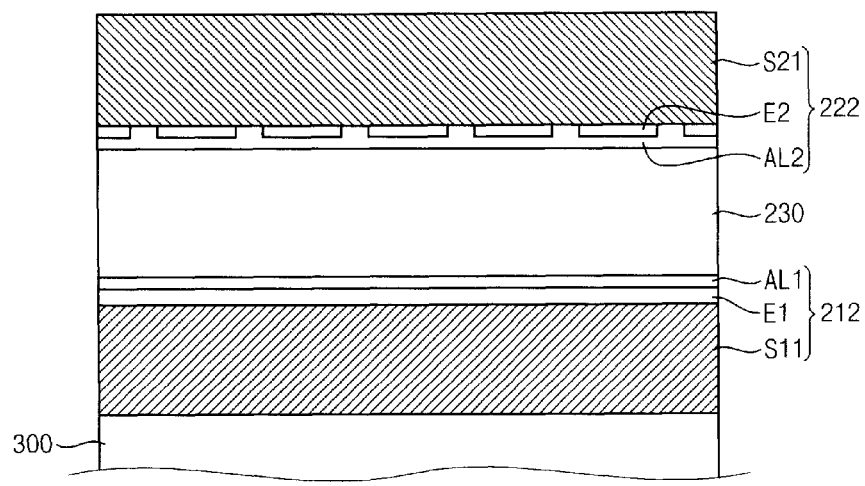
FIG. 2 is an enlarged cross-sectional view illustrating an exemplary embodiment of a polarizing liquid crystal panel of FIG. 1.

FIG. 2 is an enlarged cross-sectional view illustrating an exemplary embodiment of a polarizing liquid crystal panel of FIG. 1.

Referring to FIG. 2 with FIG. 1, the first substrate 212 includes a first base substrate S11, a first electrode E1 and a first alignment layer AL1.

The first base substrate S11 includes a plastic substrate. The plastic substrate is transparent, lighter than a glass substrate, and cheaper than the glass substrate. Examples of a material of the plastic substrate may include polycarbonate ("PC"), triacetyl cellulose ("TAC") or cyclic olefin copolymer ("COC"), etc.

Although the first base substrate S11 includes the plastic substrate, the display panel 100 is disposed under the first base substrate S11 so that an inflow of moisture to the liquid crystal layer 230 from an outside of the first base substrate S11 may be minimized. Thus, when the first base substrate S11 is a base substrate of the lower first substrate 212, an additional moisture resistant layer capable of preventing the inflow of moisture may not be on the first base substrate S11.

The first electrode E1 may be directly on the first base substrate S11. The first electrode E1 may include transparent and conductive material such as indium zinc oxide, indium tin oxide, etc. The first electrode E1 is a patternless electrode on and overlapping substantially an entire of the first base substrate S11. The patternless electrode is a single, unitary, indivisible electrode layer on the first base substrate S11 excluding patterns thereon or therein. Since the first electrode E1 is the patternless electrode, damage to the first base substrate S11 in patterning the layer thereon may be reduced or effectively prevented, and the first electrode E1 may be stable on the plastic first base substrate S11 during a continuous roll-to-roll manufacturing process.

The first alignment layer AL1 is on the first base substrate S11 including the first electrode E1 thereon. The first alignment layer AL1 is on and overlapping an entire of the first base substrate S11.

The first electrode E1 and the first alignment layer AL1 are on a first surface of the first base substrate S11. The adhesive member 300 is on a second surface opposite to the first surface of the first base substrate S11, and interposed between the second surface and the display panel 100, to attach the polarizing liquid crystal panel 201 and the display panel 100 to each other.

The second substrate 222 includes a second base substrate S21, a second electrode E2 and a second alignment layer AL2.

The second base substrate S21 includes a glass substrate. The second base substrate S21 includes the glass substrate to reduce or effectively prevent the moisture from flowing in the liquid crystal layer 230 from the outside of the display apparatus 801. Therefore, an additional moisture resistant layer may not be on the second substrate S21.

The second electrode E2 may be directly on the second base substrate S21. The second electrode E2 may include substantially the same material as the first electrode E2. The second electrode E2 is a patterned electrode including a plurality of sub-electrodes. The sub-electrodes are spaced apart from each other. Alternatively, the second electrode E2 may be a patternless electrode on and overlapping substantially an entire of the second base substrate S21.

The second alignment layer AL2 is on the second base substrate S21 including the second electrode E2 thereon. The second alignment layer AL2 is on and overlapping an entire of the second base substrate S21. The second alignment layer AL2 may align the liquid molecules of the liquid crystal layer 230 in concert with the first alignment layer AL1.

The second electrode E2 and the second alignment layer AL2 are on a first surface of the second base substrate S21, and a second surface opposing the first surface of the second base substrate S21 is disposed toward the viewing side of the polarizing liquid crystal panel 201 and at an outer portion of the display part 601. The phase retardation member 400 is disposed on the second surface of the second base substrate S21.

According to the above descriptions, the first base substrate S11 of the first substrate 212 as the lower substrate of the polarizing liquid crystal panel 201 includes the plastic substrate which is cheaper than the glass substrate to decrease a manufacturing cost of the polarizing liquid crystal panel 201. In particular, where the first base substrate S11 includes the plastic substrate, the display panel 100 may reduce or effectively prevent inflow of moisture from outside the display panel 100 so that an additional moisture resistant layer may not be on the first base substrate S11. In addition, the second base substrate S21 of the second substrate 222 as the upper substrate of the polarizing liquid crystal panel 201 includes the glass substrate so that an additional moisture resistant layer may not be on the second base substrate S21. Therefore, the first base substrate S11 includes the plastic substrate to minimize the manufacturing cost of the polarizing liquid crystal panel 201.

Figure 3:
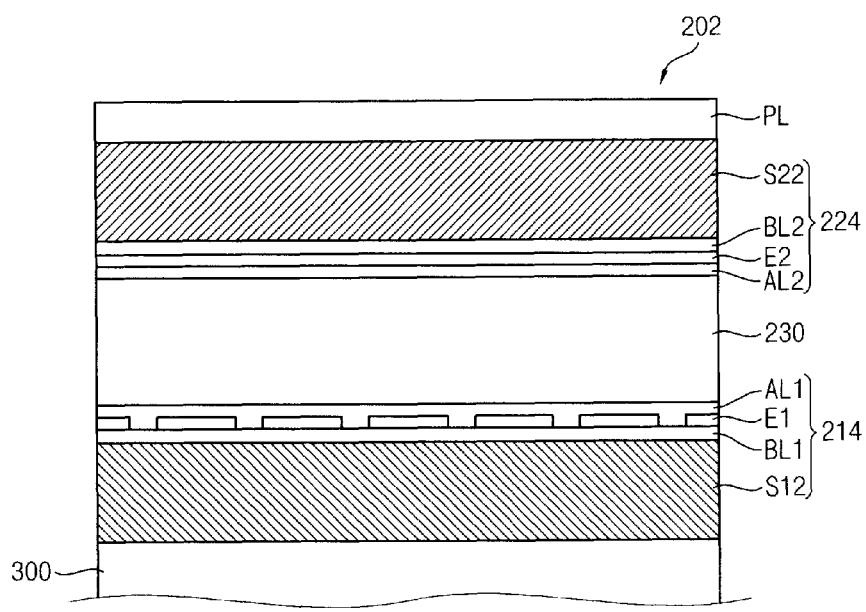
FIG. 3 is an enlarged cross-sectional view illustrating another exemplary embodiment of a polarizing liquid crystal panel according to the invention.

FIG. 3 is an enlarged cross-sectional view illustrating another exemplary embodiment of a polarizing liquid crystal panel according to the invention.

A display apparatus including a polarizing liquid crystal panel 202 shown in FIG. 3 is substantially the same as the display apparatus 801 illustrated in FIG. 1 except for the polarizing liquid crystal panel 202. Thus, the display apparatus including the polarizing liquid crystal panel 202 will be illustrated referring to FIGS. 1 and 3 and any repetitive descriptions will be omitted.

Referring to FIG. 3 with FIG. 1, the display apparatus includes a display part 601 including the polarizing liquid crystal panel 202 and a polarizing glasses part 700. The display part 601 includes a display panel 100 and the polarizing liquid crystal panel 202. The display panel 100 and the polarizing liquid crystal panel 202 are attached to each other by an adhesive member 300, and a phase retardation member 400 is disposed on the polarizing liquid crystal panel 202. A light provided from a backlight assembly BLU disposed under the display panel 100 passes through the display panel 100 and the polarizing liquid crystal panel 202 to be provided to a viewer via the polarizing glasses part 700.

The polarizing liquid crystal panel 202 includes a first substrate 214, a second substrate 224 and a liquid crystal layer 230. Liquid crystal molecules of the liquid crystal layer 230 control a transmittance of the light provided from the backlight assembly BLU by an electric field applied to the liquid crystal layer 230 so that the light passing through the display panel 100 may be polarized to be a first polarized state or a second polarized state.

The first substrate 214 includes a first base substrate S12, a first buffer layer BL1, a first electrode E1 and a first alignment layer AL1.

The first base substrate S12 may be a plastic substrate. The first base substrate S12 is substantially the same as the first base substrate S11 illustrated in FIG. 2, and thus any repetitive descriptions will be omitted.

The first buffer layer BL1 is on a first surface of the first base substrate S12. The first buffer layer BL1 may reduce or effectively prevent damage to the first base substrate S12 by a solvent of a material used in the forming the first alignment layer AL1. In one exemplary embodiment, for example, the first buffer layer BL1 may reduce or effectively prevent permeation of the solvent in the first base substrate S12 or chemical reaction of the solvent with components of the first base substrate S12. The adhesive member 300 is disposed between a second surface opposing the first surface of the first base substrate S12 and the display panel 100 to attach the first base substrate S12 and the display panel 100 to each other.

The first electrode E1 is on the first buffer layer BL1. The first electrode E1 may be a patterned electrode. In an exemplary embodiment of forming the polarizing liquid crystal panel 202, after the first buffer layer BL1 is formed on the first base substrate S12 and the combined structure disposed on a plate as a stage separate from the display panel 100, the first electrode E1 may be formed on the first buffer layer BL1. Alternatively, the buffer layer BL1 and the first electrode E1 may be sequentially formed on the first base substrate S12 which is previously attached to the display panel 100 by the adhesive member 300. After an electrode material layer is formed on the first buffer layer BL1, the electrode material layer is patterned to form the first electrode E1.

The first alignment layer AL1 is entirely on and overlapping an entire of the first base substrate S12 including the first electrode E1 thereon.

The second substrate 224 includes a second base substrate S22, a second buffer layer BL2, a second electrode E2, a second alignment layer AL2 and a moisture resistant layer PL.

The second base substrate S22 may be a plastic substrate.

The second buffer layer BL2 is on a first surface of the second base substrate S22, the first surface being adjacent to the liquid crystal layer 230. The second buffer layer BL2 may reduce or effectively prevent damage to the second base substrate S22 in forming the second alignment layer AL2.

The second electrode E2 is on the second buffer layer BL2. The second electrode E2 includes a patternless electrode on substantially an entire of the second base substrate S22.

The second alignment layer AL2 is on the second base substrate S22 including the second electrode E2 thereon. The second alignment layer AL2 is on substantially an entire of the second base substrate S22.

The moisture resistant layer PL is on a second surface opposing the first surface of the second base substrate S22. Since the second base substrate S22 is the plastic substrate having a weak resistance to moisture, the moisture resistant layer PL may reduce or effectively prevent moisture passing through the second base substrate S22 and flowing in the liquid crystal layer 230. The moisture resistant layer PL may include an organic material which is cheaper than an inorganic material. The second substrate 224 includes the moisture resistant layer PL including the organic material and the plastic second base substrate S22 to decrease a manufacturing cost of the second substrate 224 and of the display apparatus including the second substrate 224. Thus, productivity in forming the display apparatus may be improved.

Although not shown in figures, the first buffer layer BL1 may be disposed between the first base substrate S11 of the first substrate 212 in FIG. 2 and the first electrode E1. The first buffer layer BL1 may reduce or effectively prevent damage to the first base substrate S11 as the plastic substrate in FIG. 2 in forming the first alignment layer AL1. Here, since the second base substrate S21 of the second substrate 222 in FIG. 2 includes the glass substrate, an additional layer such as the second buffer layer BL2 in FIG. 3 may not be in the second substrate 222.

According to the above descriptions, both of the first and second base substrates S12 and S22 of the polarizing liquid crystal panel 202 include the plastic substrate to minimize the manufacturing cost of the polarizing liquid crystal panel 202. Although the moisture resistant layer PL is on the second base substrate S22, a manufacturing cost of the moisture resistant layer PL is lower than an inorganic layer such that an entire cost of the display apparatus is minimized.

Figure 4:
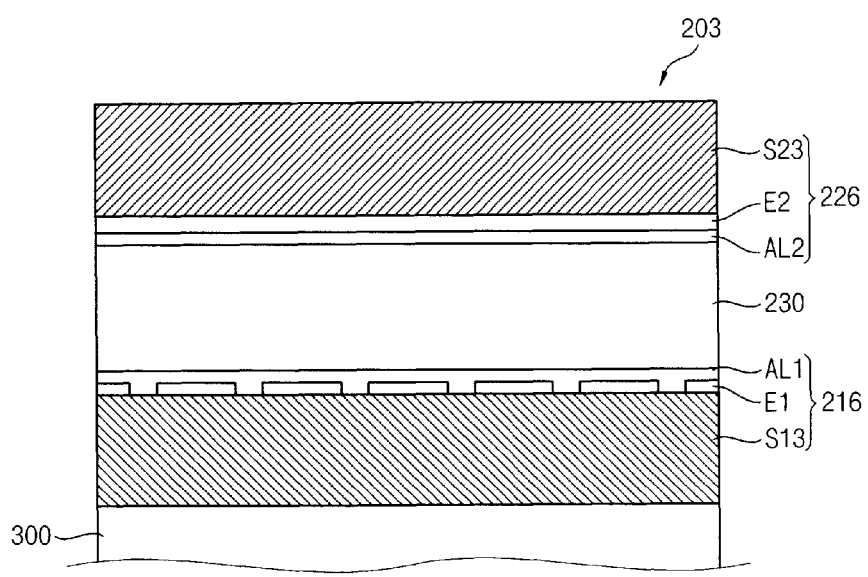
FIG. 4 is an enlarged cross-sectional view illustrating still another exemplary embodiment of a polarizing liquid crystal panel according to the invention.

FIG. 4 is an enlarged cross-sectional view illustrating still another exemplary embodiment of a polarizing liquid crystal panel according to the invention.

A display apparatus including a polarizing liquid crystal panel 203 shown in FIG. 4 is substantially the same as the display apparatus 801 illustrated in FIG. 1 except for the polarizing liquid crystal panel 203. Thus, the display apparatus including the polarizing liquid crystal panel 203 in FIG. 4 will be illustrated referring to FIGS. 1 and 4 and any repetitive descriptions will be omitted.

Referring to FIG. 4 with FIG. 1, the display apparatus includes a display part 601 including the polarizing liquid crystal panel 203 and a polarizing glasses part 700. The display part 601 includes a display panel 100 and the polarizing liquid crystal panel 203. The display panel 100 and the polarizing liquid crystal panel 203 are attached to each other by an adhesive member 300, and a phase retardation member 400 may be disposed on the polarizing liquid crystal panel 203.

The polarizing liquid crystal panel 203 includes a first substrate 216, a second substrate 226 and a liquid crystal layer 230. Liquid crystal molecules of the liquid crystal layer 230 control a transmittance of the light by an electric field applied to the liquid crystal layer 230 so that the light passing through the display panel 100 may be polarized to be a first polarized state or a second polarized state.

The first substrate 216 includes a first base substrate S13, a first electrode E1 and a first alignment layer AL1. The first substrate 216 is substantially the same as the first substrate 212 illustrated in FIG. 2 except for a shape of the first electrode E1. Thus, any repetitive descriptions will be omitted. The first substrate 216 includes the first electrode E1 as a patterned electrode including a plurality of sub-electrodes on the first base substrate S13 which is a plastic substrate. Although the first base substrate S13 includes the plastic substrate, the display panel 100 is disposed under the polarizing liquid crystal panel 203 so that an additional moisture resistant layer may not be on the first base substrate S13.

Although not shown in figures, the first substrate 216 may further include a buffer layer disposed between the first electrode E1 and the first base substrate S13. The buffer layer may reduce or effectively prevent damage to the first base substrate S13 in forming the first alignment layer AL1.

The second substrate 226 includes a second base substrate S23, a second electrode E2 and a second alignment layer AL2. The second substrate 226 is substantially the same as the second substrate 222 in FIG. 2 except for a shape of the second electrode E2. Thus, any repetitive descriptions will be omitted. The second substrate 226 includes the second electrode E2 as a patternless electrode on substantially an entire of the second base substrate S23 which is a glass substrate. Since the second base substrate S23 is the glass substrate, an additional buffer layer or an additional moisture resistant layer may not be on the second base substrate S23.

Figure 5:
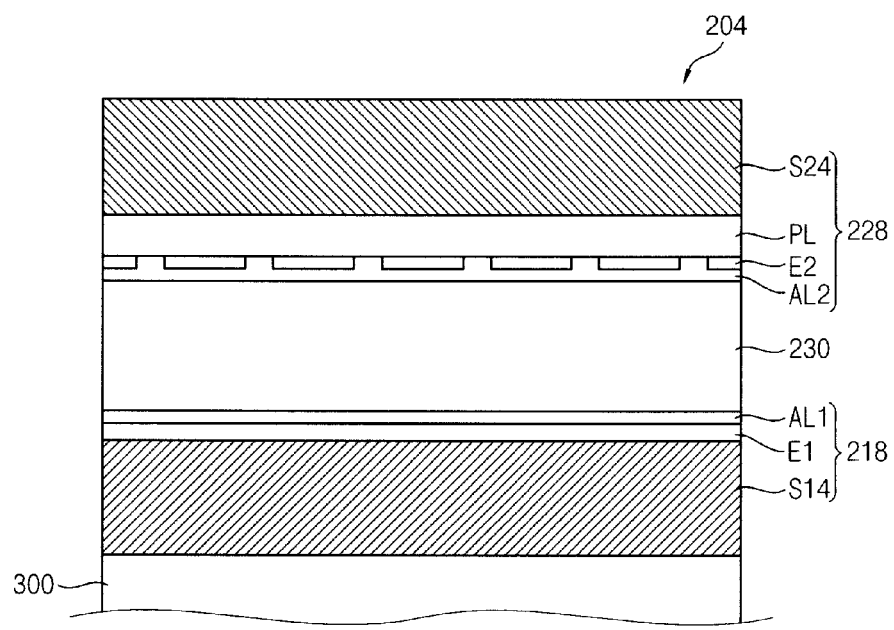
FIG. 5 is an enlarged cross-sectional view illustrating still another exemplary embodiment of a polarizing liquid crystal panel according to the invention.

FIG. 5 is an enlarged cross-sectional view illustrating still another exemplary embodiment of a polarizing liquid crystal panel according to the invention.

A display apparatus including a polarizing liquid crystal panel 204 shown in FIG. 5 is substantially the same as the display apparatus 801 illustrated in FIG. 1 except for the polarizing liquid crystal panel 204. Thus, the display apparatus including the polarizing liquid crystal panel 204 in FIG. 5 will be illustrated referring to FIGS. 1 and 5 and any repetitive descriptions will be omitted.

Referring to FIG. 5, the polarizing liquid crystal panel 204 includes a first substrate 218, a second substrate 228 and a liquid crystal layer 230.

The first substrate 218 includes a first base substrate S14, a first electrode E1 and a first alignment layer AL1. The first substrate 218 is substantially the same as the first substrate 212 in FIG. 2, and thus any repetitive descriptions will be omitted. Although not shown in figures, a buffer layer capable of reducing or preventing damage to the first base substrate S14 in forming the first alignment layer AL1 may be disposed between the first base substrate S14 and the first electrode E1.

The second substrate 228 includes a second base substrate S24, a moisture resistant layer PL, a second electrode E2 and a second alignment layer AL2.

The second base substrate S24 may be a plastic substrate.

The moisture resistant layer PL is on substantially an entire of the second base substrate S24. The moisture resistant layer PL may be on a first surface of the second base substrate S24, the first surface being adjacent to the liquid crystal layer 230. Here, a phase retardation member 400 in FIG. 1 may be on a second surface opposing the first surface of the second base substrate S24. The moisture resistant layer PL may reduce or effectively prevent moisture passing through the second base substrate S24 and flowing in the liquid crystal layer 230. The moisture resistant layer PL includes an organic material. The second substrate 228 includes the moisture resistant layer PL including the cheaper organic material and the plastic second base substrate S24 to decrease a manufacturing cost of the second substrate 228 and of the display apparatus. Thus, productivity in forming the display apparatus may be improved.

The second electrode E2 is on the moisture resistant layer PL. The second electrode E2 may be a patterned electrode including a plurality of sub-electrodes.

The second alignment layer AL2 is on the second base substrate S24 including the second electrode E2 thereon. The second alignment layer AL2 is on substantially an entire of the second base substrate S24.

Figure 6:
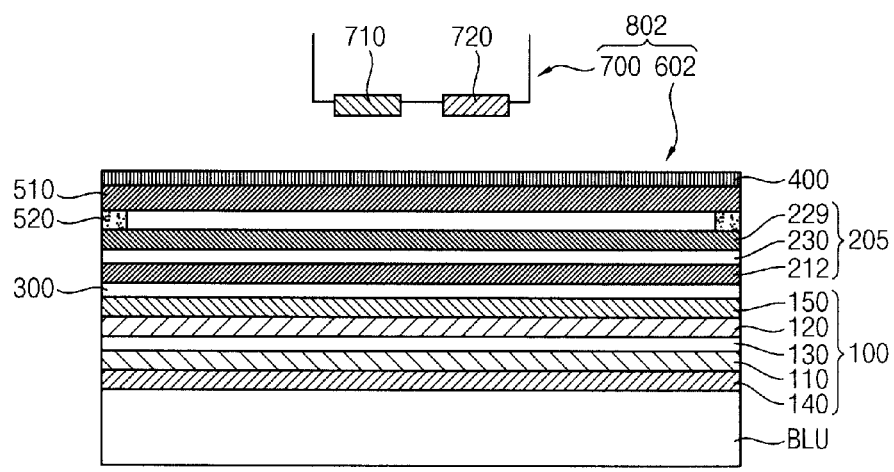
FIG. 6 is a cross-sectional view illustrating another exemplary embodiment of a display apparatus according to the invention.

FIG. 6 is a cross-sectional view illustrating another exemplary embodiment of a display apparatus according to the invention.

Referring to FIG. 6, a display apparatus 802 includes a display part 602 and a polarizing glasses part 700. The display part 602 displays a 2D image or a 3D image, and a viewer may stereoscopically recognize the 3D image through the polarizing glasses part 700 when the display part 602 displays the 3D image. Simultaneously, the display part 602 serves as a touch screen sensing an outer pressure to display an image.

The display part 602 includes a display panel 100, a polarizing liquid crystal panel 205, a touch screen member 510 and a phase retardation member 400. In addition, the display part 602 may further include a backlight assembly BLU providing a light to the display panel 100.

The display panel 100 includes a first display substrate 110, a second display substrate 120 and a display element layer 130. The display panel 100 may further include first polarizing member 140 and a second polarizing member 150. The display panel 100 is substantially the same as the display panel illustrated in FIG. 1, and thus any repetitive descriptions will be omitted.

The polarizing liquid crystal panel 205 is attached to the display panel 100 by an adhesive member 300, and is disposed on the second display substrate 120 of the display panel 100. The polarizing liquid crystal panel 205 includes a first substrate 212 as a lower substrate, a second substrate 229 as an upper substrate, and a liquid crystal layer 230.

The first substrate 212 includes a first base substrate S11, a first electrode E1 and a first alignment layer AL1, substantially the same as illustrated in FIGS. 1 and 2. Thus, any repetitive descriptions will be omitted.

The second substrate 229 includes a second base substrate S21, a second electrode E2 and a second alignment layer AL2, substantially the same as illustrated in FIGS. 1 and 2. The second electrode E2 and the second alignment layer AL2 are on a first surface of the second base substrate S21, the first surface being adjacent to the liquid crystal layer 230.

A first touch screen electrode (not shown) is on a second surface opposing the first surface of the second base substrate S21 of the polarizing liquid crystal panel 205.

The touch screen member 510 is disposed on the second substrate 229, and is attached to the polarizing liquid crystal panel 205 by a connecting member 520. The connecting member 520 is directly on a first surface of the touch screen member 510. The touch screen member 510 is disposed facing the second surface of the second base substrate S21 of the second substrate 229. A second touch screen electrode (not shown) is on the first surface of the touch screen member 510 which faces the second surface of the second substrate 229. When an outer pressure is provided to the touch screen member 510, the first and second touch screen electrodes are connected to each other by a resistive type element, to thereby indicate a touch to the touch sensing display apparatus 802. Both the first and second touch screen electrodes may be considered a part of a touch screen panel since they are both used to indicate the touch.

Alternatively, the touch screen member 510 is a conductive film or a conductive film attached to a base substrate. Where, the touch screen member 510 is or includes a conductive film, such touch screen member is on the polarizing liquid crystal panel 205 to drive a capacitive type element.

The phase retardation member 400 is disposed on the touch screen member 510.

In FIG. 6, the first and second substrates 212 and 229 are substantially the same as illustrated in FIG. 2. Alternatively, the polarizing liquid crystal panel 205 in FIG. 6 may have substantially the same structure as the polarizing liquid crystal panel illustrated in FIGS. 3, 4 and 5, and the first touch screen electrode may be on an outer portion of the second substrate of the respective polarizing liquid crystal panels in FIGS. 3, 4 and 5.

According to the above descriptions, the polarizing liquid crystal panel 205 and a touch screen panel effectively share the second substrate 229, thereby decreasing an overall thickness and weight of the display apparatus 802.

In an exemplary embodiment of forming the polarizing liquid crystal panel 205, where the first surface of the second base substrate S21 of the second substrate 229 on which the second electrode E2 and the second alignment layer AL2 are formed is disposed on a stage of a substrate manufacturing device after the second electrode E2 and the second alignment layer AL2 are formed, the formed second electrode E2 and the formed second alignment layer AL2 may be damaged. However, driving of the polarizing liquid crystal panel 205 is less affected from the damage to the second electrode E2 and the second alignment layer AL2, so that the second surface of the second base substrate S21 of the second substrate 229 may be shared by the touch screen panel and the polarizing liquid crystal panel 205. By sharing the second substrate 229, an addition substrate is eliminated and a number of substrates may be easily decreased. Thus, a manufacturing cost of the display apparatus may be decreased and productivity in forming the display apparatus may be improved.

Figure 7:
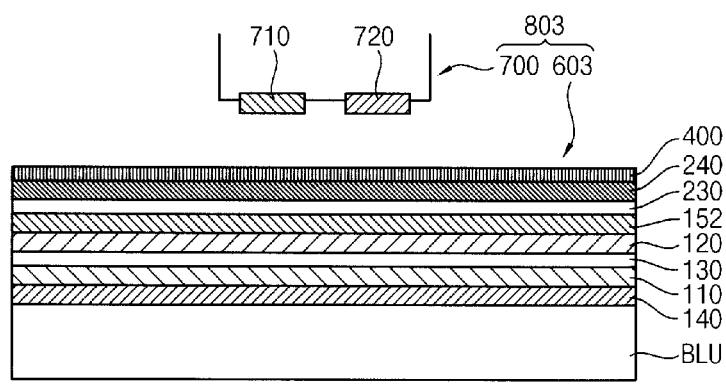
FIG. 7 is a cross-sectional view illustrating still another exemplary embodiment of a display apparatus according to the invention.

FIG. 7 is a cross-sectional view illustrating still another exemplary embodiment of a display apparatus according to the invention.

Referring to FIG. 7, a display apparatus 803 includes a display part 603 and a polarizing glasses part 700.

The display part 603 includes a first display substrate 110, a second display substrate 120, a display element layer 130, a first polarizing member 140, a second polarizing member 152, a liquid crystal layer 230, an opposite substrate 240 and a phase retardation member 400.

The first and second display substrates 110 and 120, and the display element layer 130 are substantially the same as illustrated in FIGS. 1 and 2. Thus, any repetitive descriptions will be omitted.

The first polarizing member 140 is disposed on a first surface of the first display substrate 110, and the second polarizing member 152 is disposed on a second surface of the second display substrate 120.

The opposite substrate 240 is disposed facing the second polarizing member 152, and the liquid crystal layer 230 is interposed between the opposite substrate 240 and the second polarizing member 152. Hereinafter, the second polarizing member 152 and the opposite substrate 240 will be illustrated in detail, referring to FIG. 8.

Figure 8:
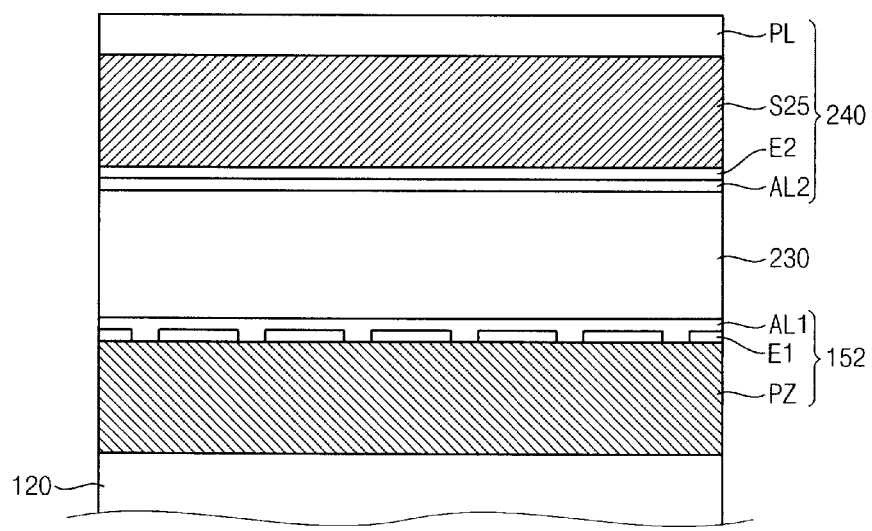
FIG. 8 is an enlarged cross-sectional view of an exemplary embodiment of a second polarizing member and an opposite substrate of FIG. 7.

FIG. 8 is an enlarged cross-sectional view of an exemplary embodiment of a second polarizing member and an opposite substrate of FIG. 7.

Referring to FIG. 8 with FIG. 7, the second polarizing member 152 includes a polarizing layer PZ polarizing a light substantially passing through the display element layer 130. The first polarizing member 140 may be substantially the same as the second polarizing member 152 except for a direction of a polarizing axis of the polarizing layer PZ.

The second polarizing member 152 further includes a first electrode E1 and a first alignment layer AL1 on the polarizing layer PZ. The second display substrate 120 is disposed directly on a first surface of the polarizing layer PZ, and the first electrode E1 and the first alignment layer AL1 are disposed on a second surface opposing the first surface of the polarizing layer PZ. The first electrode E1 is a patterned electrode including a plurality of sub-electrodes, and the first alignment layer AL1 is on substantially an entire of the polarizing layer PZ. Here, the polarizing layer PZ may include a plastic substrate or a glass substrate as a base substrate.

The opposite substrate 240 includes a plastic base substrate S25, a second electrode E2, a second alignment layer AL2 and a moisture resistant layer PL.

The second electrode E2 and the second alignment layer AL2 are on a first surface of the plastic base substrate S25, the first surface being adjacent to the liquid crystal 230, and the moisture resistant layer PL is on a second surface opposing the first surface of the plastic base substrate S25. Alternatively, the moisture resistant layer PL may be between the plastic base substrate S25 and the second electrode E2. The moisture resistant layer PL includes an organic material to reduce or effectively prevent a moisture from inflowing in the liquid crystal layer 230. Each of the second electrode E2 and the second alignment layer AL2 may be on substantially an entire of the plastic base substrate S25.

According to the above descriptions, a total of three substrates are used to manufacture the display part of a display apparatus which displays a stereoscopic image, and the plastic substrate S25 as the base substrate of the opposite substrate 240 is used to decrease a manufacturing cost of the display apparatus.

According to the invention, at least one base substrate of two substrates of a polarizing liquid crystal panel uses a plastic substrate to decrease a material cost in comparison to use a glass substrate for all base substrates. Thus, productivity of manufacturing the polarizing liquid crystal panel and the display apparatus may be improved.

In addition, when a base substrate of a lower substrate in the polarizing liquid crystal panel adjacent to a display panel uses the plastic substrate, the display panel may function as a moisture barrier and reduce or effectively prevent moisture from penetrating into the polarizing liquid crystal panel. Alternatively, when a base substrate of an upper substrate opposing the lower substrate in the polarizing liquid crystal panel uses the plastic substrate, a moisture resistant layer including an organic material cheaper than an inorganic material functions as a moisture barrier to minimize penetration of the moisture into the polarizing liquid crystal panel. Therefore, the polarizing liquid crystal panel may have a stable structure with respect to changing environmental conditions which may include moisture elements.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A polarizing liquid crystal panel comprising:
   a first substrate comprising a plastic substrate, a first electrode on the plastic substrate, and a first alignment layer on the first electrode;
   a second substrate comprising a base substrate which opposes the first substrate, a second electrode on the base substrate, and a second alignment layer on the second electrode; and
   a liquid crystal layer between the first and second substrates, wherein the liquid crystal layer polarizes a light and uses an electric field between the first and second electrodes,
   wherein
   among the substrates of the polarizing liquid crystal panel, the second substrate is further from a display panel on which the polarizing liquid crystal panel is disposed than the first substrate, and
   a moisture resistant layer is not disposed between the display panel and the liquid crystal layer of the polarizing liquid crystal panel.

2. The polarizing liquid crystal panel of claim 1, wherein the first substrate further comprises a buffer layer between the plastic substrate and the first electrode, wherein the buffer layer protects the plastic substrate.

3. The polarizing liquid crystal panel of claim 1, wherein one of the first and second electrodes comprises a patterned electrode including a plurality of sub-electrodes.

4. The polarizing liquid crystal panel of claim 1,
wherein the first electrode comprises a patternless electrode on an entire of the plastic substrate, and
wherein the second electrode comprises a patterned electrode including a plurality of sub-electrodes.

5. The polarizing liquid crystal panel of claim 1, wherein the base substrate comprises a plastic substrate.

6. The polarizing liquid crystal panel of claim 5, wherein the second substrate further comprises:
a moisture resistant layer on one of a first surface of the base substrate including the second electrode thereon, and a second surface which opposes the first surface, the moisture resistant layer including an organic material.

7. The polarizing liquid crystal panel of claim 5, wherein the second substrate further comprises a buffer layer between the base substrate and the second electrode, wherein the buffer layer protects the base substrate.

8. The polarizing liquid crystal panel of claim 1, wherein the base substrate comprises a glass substrate.

9. The polarizing liquid crystal panel of claim 1, wherein the plastic substrate comprises one of polycarbonate, triacetiyl cellulose and cyclic olefin copolymer.

10. A display apparatus comprising:
a display panel which displays a stereoscopic image; and
a polarizing liquid crystal panel on the display panel and comprising:
a first substrate comprising a plastic substrate, a first electrode on the plastic substrate, and a first alignment layer on the first electrode;
a second substrate comprising a base substrate which opposes the first substrate, a second electrode on the base substrate, and a second alignment layer; and
a liquid crystal layer between the first and second substrates, wherein the liquid crystal layer polarizes a light which passes through the display panel,
wherein
among the substrates of the polarizing liquid crystal panel, the first substrate is closer to the display panel than the second substrate, and
a moisture resistant layer is not disposed between the display panel and the liquid crystal layer of the polarizing liquid crystal panel.

11. The display apparatus of claim 10,
wherein the base substrate comprises a plastic substrate.

12. The display apparatus of claim 11, wherein the second substrate further comprises a moisture resistant layer including an organic material.

13. The display apparatus of claim 10,
wherein the base substrate comprises a glass substrate.

14. The display apparatus of claim 10, wherein one of the first and second electrodes comprises a patterned electrode, and the other comprises a patternless electrode.

15. The display apparatus of claim 10,
wherein the first electrode comprises a patternless electrode on an entire of the plastic substrate, and
wherein the second electrode comprises a patterned electrode including a plurality of sub-electrodes.

16. The display apparatus of claim 10, further comprising a touch screen member on the polarizing liquid crystal panel.

17. The display apparatus of claim 10, further comprising polarizing glasses which receive an image which passes through the polarizing liquid crystal panel, wherein the polarizing glasses part includes a left eye part and a right eye part having different polarizing properties from each other.

18. A display apparatus comprising:
a display panel which displays a stereoscopic image, comprising a display element layer between opposing display substrates, and a polarizing member of which a first surface faces the display substrates; and
a polarizing liquid crystal panel comprising:
the polarizing member, a first electrode directly on a second surface of the polarizing member opposite to the first surface, and a first alignment layer on the first electrode; and
an opposite substrate comprising a plastic substrate which faces the polarizing member, a second electrode on the plastic substrate, a second alignment layer on the second electrode, and a moisture resistant layer including an organic material; and
a liquid crystal layer between the polarizing member and the opposite substrate.

* * * * *